United States Patent
Picciotti et al.

(12) United States Patent     (10) Patent No.:    US 6,203,693 B1
Picciotti et al.                    (45) Date of Patent:    Mar. 20, 2001

(54) PROCESS AND APPARATUS FOR STRONGLY REDUCING THE COKE DUST IN THE EFFLUENTS DURING THE DECOKING OF THE HYDROCARBON CRACKING OVENS FOR THE PRODUCTION OF OLEFINS

(75) Inventors: Marcello Picciotti; Dario Beltrame; Roberto Di Cintio, all of Rome (IT)

(73) Assignee: Technip Italy S.p.A., Rome (IT)

( * ) Notice: Subject to any disclaimer, the term of this patent is extended or adjusted under 35 U.S.C. 154(b) by 0 days.

(21) Appl. No.: 09/461,180

(22) Filed: Dec. 14, 1999

(30) Foreign Application Priority Data

Sep. 22, 1999 (IT) .............................................. RM99A0583

(51) Int. Cl.$^7$ .............................. C10G 9/16; C10B 43/02; B01D 47/12

(52) U.S. Cl. .................... 208/48 R; 196/46.1; 196/99; 196/102; 202/180; 202/185.1

(58) Field of Search .................................. 208/48 R, 131; 585/648; 96/376; 196/46.1, 99, 102

(56) References Cited

U.S. PATENT DOCUMENTS

| 4,225,415 | * | 9/1980 | Mirza et al. | .......................... 208/8 R |
| 4,226,698 | * | 10/1980 | Schroeder | ............................. 208/8 R |
| 4,505,808 | * | 3/1985 | Brunner et al. | ..................... 208/11 R |

* cited by examiner

*Primary Examiner*—Bekir L. Yildirim
(74) *Attorney, Agent, or Firm*—Stevens, Davis, Miller & Mosher, LLP

(57) ABSTRACT

An apparatus for reducing the coke dust in the decoking effluents of the hydrocarbon cracking ovens according to the invention provides means for the condensation of the effluent, means for collecting a liquid condensate, means for filtering said liquid condensate, and means for washing the residual vapours and gases that cannot be condensed by using the same condensate suitably filtered from coke, the filtered condensate being evaporated for the following discharge to the atmosphere by using the thermal content of the input decoking gases. A process for reducing the coke dust in the decoking effluents of the hydrocarbon cracking ovens according to the invention consists in that the solid content in the gaseous effluent from the decoking is removed by filtration of the condensate from said gaseous effluent and by washing of gases and vapours contained therein that cannot be condensed.

15 Claims, 1 Drawing Sheet

Figure 1:
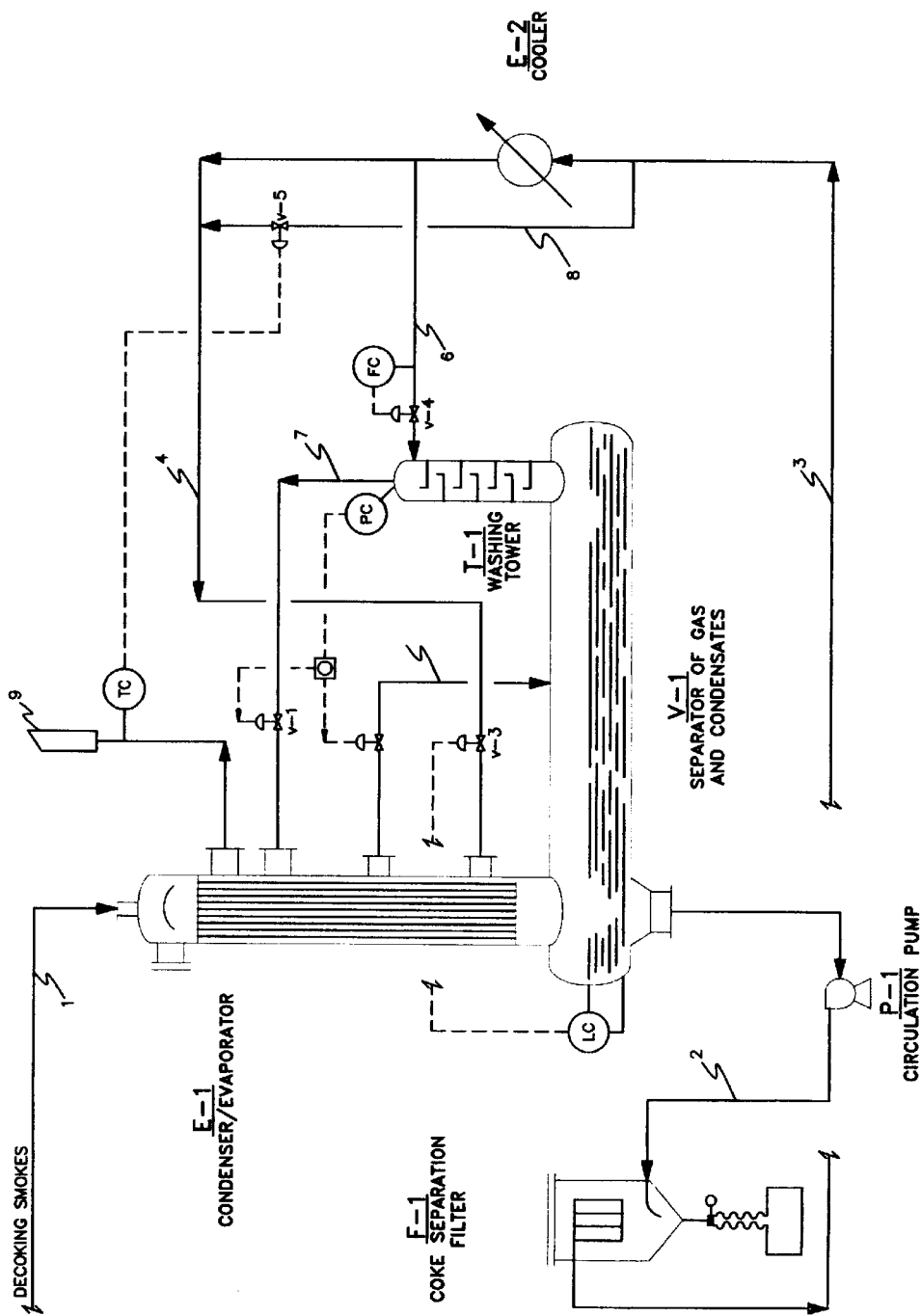

PROCESS AND APPARATUS FOR STRONGLY REDUCING THE COKE DUST IN THE EFFLUENTS DURING THE DECOKING OF THE HYDROCARBON CRACKING OVENS FOR THE PRODUCTION OF OLEFINS

The present invention relates to a process and an apparatus for strongly reducing the coke dust in the effluent flue gases and vapours during the decoking of cracking ovens for the production of olefins, particularly ethylene, with a dry content of coke in the gas effluents lower than 50 mg per $Nm^3$ gas, without other liquid and/or solid effluents to be treated.

It is known that the inside of the tubes of the radiating section of hydrocarbon cracking ovens for the production of olefins is subjected to get dirty because of the very hard carbon deposits that occur during the operation so that they should be removed periodically by a so-called "decoking".

Such carbon deposits grow up because of the temperature of the process, typically in the range of 850–870° C., with skin temperatures of the coil of 950–980° C. under cleaned conditions of the oven. In operation, such temperature increases gradually because of such deposits and reaches maximum values of 1110–1150° C. At this point the oven must be stopped for "decoking".

The decoking operation consists of removing the coke by combustion controlled by air and vapour, being careful the combustion temperature is keeping in the range of 700–800° C.

Such operation is very delicate and is carried out gradually, being careful to avoid a too fast combustion of the coke which would damage the material of the tubes. To this end, the decoking is started initially by vapour that is gradually reduced and replaced with air supporting the combustion preferably in three following steps.

At the beginning of the operation, an almost mechanical removal of the coke from the inside surface of the coil is caused by the thermal contraction of the material of the coil which causes coke to crush and/or crumble so that coke scales of a certain size are present in the effluents. Said contraction of the coil occurs because the decoking temperature is essentially lower than the temperature of a normal operation.

When the combustion starts, the size of the particles in the combustion gases decreases progressively and the oxygen content in the effluents is lowered while $CO_2$ increases.

As the combustion continues and when the removal of coke is almost completed, the amount of air is increased and $CO_2$ in the effluent begins to decrease. When $CO_2$ measured in the effluent is lower than 0.5% referred to the volume of the total gas, the decoking is to be regarded as finished.

The mixture of air, coke and flue gases at about 805–810° C. is passed through a heat exchanger that generates vapour at a very high pressure of the order of 120 bar, with the purpose of quenching the reaction gases to prevent undesired reactions. During decoking the jacket of such heat exchanger, so-called "quench boiler", is filled with water. When passing through such exchanger, the above mixture is quenched to about 340–350° C., whereupon it passes through a cyclone so that the gas escapes from the coke particles before being vented to the atmosphere.

Typical compositions and flow rates of gaseous and solid effluents for ovens of little and medium capacity (25,000 t/y and 50,000 t/y) during the three different steps of decoking are shown in the following Tables 1, 2 and 3.

Up to now the Italian standards prescribed that the solid content in the gaseous effluent should be lower than 30 mg per $Nm^3$ total volume (vapour plus gas). The regulations of some European countries that will presumably be followed as European Regulations prescribe that the maximum coke content which can be admitted in the effluents is lower that 50 mg per $Nm^3$ dry gas.

The following Tables 4 and 5 show the maximum content of coke dust equivalent to the above-mentioned prescribed value which can be admitted in the total effluent with reference to the ovens of capacity 25,000 t/y and 50,000 t/y, respectively. The present technology allows ovens of greater capacity (up to 120,000 t/y) to be manufactured, for which similar Tables may be shown.

More severe regulations have drastically reduced the maximum content of coke dust which can be admitted by a factor 10 to 20. From now on 1.5 to 3 $mg/Nm^3$ instead of 30 $mg/Nm^3$ according to the preceding regulations are admissible in the vapours.

Actually the need of a suitable apparatus for removing coke particles from decoking gases has been known to those skilled in the art for long time, however, it has not drawn designer's attention as such even delicate operation is essentially regarded as a discontinuous operation of maintenance for cleaning ovens. In fact the decoking is only necessary every 60–70 days for an oil cracking oven, and every 80–120 days for a gas cracking oven.

The time between two successive decoking operations is further prolonged if lower cracking temperatures and vapour dilution ratios (ratio between weight of the vapour and weight of hydrocarbons) greater than the conventional ratios are reached: typically 0.25–0.30 for ethane, 0.45–0.55 for virgin naphtha, 0.60–0.80 or even 1.0 for batches of heavier hydrocarbons.

The nature of the coke to be removed strongly depends on the nature of the hydrocarbon which is more metallic with gaseous batches, more bituminous, tarry, softer with very heavy batches.

By the way, it is necessary to point out that the market does not offer at present any technology tested for such application that guarantees limited investment costs, reduced overall dimensions, easy handling, and reduced maintenance.

In fact, the new regulations make illegal those cracking plants having a conventional cyclone installed in the decoking effluent, whose maximum retention of 99.9% allows 20 $mg/Nm^3$ to be reached in the best case instead of 1.5–3 $mg/Nm^3$ prescribed by said regulations.

Therefore, the invention seeks to provide an apparatus which is sturdy, flexible and above all not inclined to get dirty, be corroded, clogged and so on but capable of strongly reducing the coal dust contained in the effluents during decoking, irrespective of any severe problem due to the properties of the solid content to be separated from the gaseous effluent having, as previously mentioned, different nature and morphology during the decoking steps.

A better understanding of the invention will result from the following description with reference to the accompanying drawing that shows the preferred embodiment over other technologies only by way of a not limiting example.

The apparatus and the technology described allows a strong reduction of the coal dust carried by the gas up to the values requested by the specifications of the regulations mentioned above.

Particularly, the invention has been conceived and compared with a lot of alternative solutions and the results have been shown in Tables T1 and T2 mentioned above. It is evident from those tables that the present invention gives optimum results under any point of view.

The most modern cracking technologies actually provide a lining of the coil either consisting of a ceramic coating or materials such as to prevent the deposit of coke. Other technologies intended to reduce the deposit of coke by the addition of a chemical sulphur composition are being developed, especially as far as the gaseous hydrocarbons such as ethane/propane, e.g. dimethyl disulphide, etc., is concerned.

There is still the tendency, that has found many opponents up to now, to convey decoking vapours and flue gases inside the combustion chamber where the coke should be definitively removed. There are, however, troubles such as erosion and dirt problems both in the radiating and convection area, the presence of black particles in the flue gases, etc.

In order to prevent such troubles, there is the tendency, especially in Europe, to use water scrubbers that have, however, a poor dust removal efficiency and above all transfer the pollution from air to water, thus causing problems for the treatment of the latter. At last, in order to make the washing more efficient, there is the tendency to condense all of the vapours with high cost of investment as well as cost of providing pumping means and operation fluids such as cooling water.

It should be further appreciated that beside the pollution due to the carbon particles, the decoking effluent has a not negligible visual impact since the gases saturated with vapours give rise to the production of large white clouds at room temperature that cause anxiety and ill-humour in the people dwelling in the surroundings.

The present invention overcomes not only all of the troubles found in the presently used systems of reducing the coke dust in the decoking flue gas but it is particularly suitable to overcome the problems of the old plants where the technologies described above, such as the lining of the coils and the combustion inside the combustion chamber, cannot be applied.

Furthermore, the world stock of plants for the production of ethylene consists of installations to which the known technologies cannot be applied so that the invention described can finally solve the problems connected to the treatment of the decoking effluents from cracking ovens of the plants for the production of ethylene.

The invention is based on the condensation of the effluent and the filtration of the condensate to separate the coke. What cannot be condensed is washed with the filtered condensate before being vented to the atmosphere together with the condensate vaporization product, that is used as coolant in the jacket of the evaporator, once filtered and cooled.

The diagram of FIG. 1 shows the apparatus so-called "autothermal separator" whose principle of operation consists of the condensation followed by the evaporation—supported by the heat content of the gas—of the condensate previously filtered and cooled in an outside cooler. The solid content is recovered from the filters.

The evident advantages of the invention are as follows:

complete removal of liquid effluents, i.e. black water to be treated;

simplified system for handling the solid captured by the filter;

no visual impact (flue gases and vapours vented to the atmosphere are very hot);

negligible consumption of service fluids;

low investment cost;

limited plan dimensions;

fully automatic operation;

the collected coke is dry and can be used as it is, i.e. coke dust, or transformed for further use because of its high content of graphitic carbon. The apparatus separates and dries completely the coke and allows an amount of gas and vapours equal to the gas mixture entering the plant to escape to the atmosphere.

With reference now to the diagram of FIG. 1, the autothermal separator according to the invention includes a vertical tube nest exchanger E-1 performing the function of condenser/evaporator which is located at one end of a horizontal tank V-1 having the function of separator of gase and condensate for collecting the condensate containing coke, such tank being provided at its other end with a vertical washing tower T-1.

The flue gas/vapours/coke flowing at high speed (40–50 m/s) by line 1 enter from the above into the hot head of condenser/evaporator E-1 in which a drilled plate is provided for the protection of the tube nest distributor of the exchanger against the solid particles. When passing through exchanger E-1, a large amount of vapour condenses on the inside surface of the tube nest so as to slow down the descending solid which is trapped in the condensate collected in tank V-1 and is fed to cooler E-2 by pump P-1 through line 2, filter F-1 and line 3.

While the coke is adherent to the vertical filtering panel of filter F-1, the condensate enters the jacket of evaporator E-1 by line 4 after having been cooled in the jacket of cooler E-2.

When passing in the cold tubes of evaporator E-1 the decoking gases condense and water evaporates from the jacket. The condensate, in which most of the solid is trapped, is collected in the separator tank V-1 of the condensate.

In fact the steam of the decoking gases that condenses on the inside surface of the tubes of condenser E-1 slows down with respect to the gas and forms a layer of liquid against which the solid collides and is trapped. The condensate containing the coke is speeded up downwards to the tank V-1 receiving the condensate from the solid-gaseous mixture of the incoming hot flue gases.

The solid particles of coke trapped in the condensate becomes stratified on the bottom of condensate tank V-1 located under evaporator/condenser E-1.

Within tank/separator V-1 the gases that cannot be condensed and the vapours are separated from the condensate and flow to washing tower T-1 where they are washed in counter-current, with a portion of the condensate filtered in F-1 and cooled in E-2 being fed to the tower again under controlled flow rate through a control valve v-4 located in line 6.

The gas washing and a further condensation of the vapours take place in tower T-1. The total condensate of the system is equal to the condensate produced within the tubes of condenser/evaporator E-1 plus the condensate produced in the tower. The not condensed vapours flow back through vent valve v-1 to the jacket of evaporator E-1 where they are overheated by the hot flue gases before being vented to the atmosphere.

The pressure of the system is controlled by pressure controller PC of washing tower T-1 above tank V-1 operating control valve v-2 which throttles the overflow weir of line 5 from E-1 to V-1 and opens vent valve v-1 of tower T-1 in line 7 that vents the same amount of gas-vapour mixture as the gas-vapour mixture entering the apparatus out to the atmosphere through the jacket of condenser E-1 and pipe 9.

The condensate produced by the entering mixture that causes the level in separator V-1 under the tube nest of the evaporator to rise is sucked by pump P-1 and fed to filter F-1 for the separation of coke by line 2. The filtrate reaches then refrigerator E-2 by line 3 where it is cooled, whereupon one portion is fed to tower T-1 by line 6 and the remaining portion to the jacket of the evaporator by line 4.

It should be appreciated that, according to the invention, only the condensate producing an increase of level in tank V-1 is fed to the jacket of condenser E-1 after cooling in cooler E-2 in order to be disposed by evaporation. Therefore, the initial water content in the system is kept during the operation essentially unchanged. Particularly the water level in tank V-1 is controlled by a control valve v-3 in line 4 and operated by level controller LC of tank V-1.

A temperature controller TC in the air vent pipe of line 9 ensures that the discharge temperature is as desired by the operation of control valve v-5 in line 8 by-passing cooler E-2.

The system is kept under water circulation upon starting, with condenser E-1 being filled with water up to the height of the weir and the level in tank V-1 being low. Pressure controller PC in tower T-1 is set to absolute pressure of about 2 bar, so control valve v-1 in line 7 is closed, and valve v-2 in line 5 is open.

The water contained in tank V-1 is circulated by pump P-1 through the whole apparatus, including the jacket of evaporator E-1, and flows back to tank V-1 both through tower T-1 and overflow line 5 of the jacket of condenser E-1, the valve v-2 of which is temporarily open.

Under such operating conditions the apparatus is ready to receive the decoking effluent.

As soon as the gas/vapour mixture comes out of the ovens, the pressure in the apparatus rises and is shown by pressure controller PC of tower T-1. The presence of gases which cannot be condensed causes the pressure to increase quickly until a predetermined value which is shown by pressure controller PC that throttles immediately valve v-2 and vents gases and vapours through valve v-1 which opens instantaneously.

The increased pressure in the system causes the vapour condensation rate to rise so that the incoming condensed vapour drips into tank V-1 and increases the level thereof. Therefore, the condensate is fed by pump P-1 and filtered by filter F-1, whereafter it passes through cooler E-2 and control valve v-3 operated by level controller LC of tank V-1 and is transferred to the jacket of evaporator E-1.

The initially cold water in the jacket of the evaporator is heated quickly by the incoming condensing vapours and reaches the boiling temperature by evaporation up to the absorption of the same amount of heat as that delivered by the incoming vapour in order to lower the temperature of the latter and to condense it.

The apparatus according to the invention quickly reaches a stationary condition characterized by the disposal of a cleaned air/vapour mixture to air in the same amount as the entering mixture purified from the coke dust contained therein.

As soon as the input gas reduces in volume and then the decoking operation is about to end, the apparatus is ready to return to the initial conditions. In other words, as the pressure is reduced, valve v-1 reduces its discharge and closes gradually and valve v-2 opens and establishes the initial water circulation again.

It is self-evident that, when the decoking is about to end, the system is self-regulating to the rest condition where vent valve v-1 in line 7 closes and valve v-2 in the descending branch of line 5 opens, both valves being controlled in split-range by pressure controller PC located in tower T-1.

The operation of the apparatus based on a dynamic simulation technique is then inherently stable as the system is soon active from the cold condition, i.e. only with cold water in circulation, and as soon as the hot decoking gases are fed, the system causes automatically the gases which cannot be condensed plus the cleaned vapours to escape to air in the same amount as that contained in the effluent. When the decoking is finished, the system is self-regulating to the initial condition without any control by the operator.

EXAMPLE OF DESIGNING

For an exemplificative designing of the apparatus according to the invention it has been assumed that two decoking ovens operate at the same time: one oven of 25,000 t/y and the second oven of 50,000 t/y. The solid and gaseous effluents of such ovens are shown in the following Tables 1–3 as far as their peak values is concerned in order to guarantee the following two essential characteristics for the operation of the evaporator:

the maximum thermal load the minimum hydraulic loss

Therefore, the vapour flow rate is: 27,200 kg/h and the gas flow rate is: 5,200 kg/h the total flow rate of the effluent is: 32,400 kg/h at the temperature of 340° C.

Of course, the present invention is able to operate steadily also in all of the other decoking gas discharge conditions that may occur.

The maximum thermal load Q of the outside cooler E-2 is the same as the difference between the thermal content of the entering gas He at 340° C. and that of the gas vented to the atmosphere Hu at 180° C., i.e.:

$$Q = He - Hu = 2.4 \text{ MM kcal/h}$$

Under such designing conditions, evaporator/condenser E-1 condenses an amount A of 20,000 kg/h from 27.2 tons vapour contained in the gases at absolute temperature and pressure of condensation equal to about 110° C. and 2 bar, respectively.

The mixture of gas (=5,200 kg/h) and vapours (7,200 kg/h) not condensed in condenser E-1 and developed in tank V-1 has a composition of 70% vapour and 30% gas by volume, the gases that cannot be condensed having an average molecular weight of 30.

The pressure in tank V-1 is equal to an absolute pressure of 2.04 bar, while the available thermal content of the effluent is about 14 MM kcal/h.

Assuming that vapours at 180° C. are vented to the atmosphere after their production by evaporation of the filtered condensate from the initial temperature of 50° C., the flow rate of the condensate PC that is disposed by evaporator/condenser E-1 is:

$$PC \cong \frac{14,000,000}{630} \cong 22,000 \text{ kg/h}$$

where 630 kg/h is the difference between the enthalpies of vapour at 180° C. and water at 50° C.

Thus, the sensible heat absorbed by overheating the gases vented by tower T-1 and entered into the high portion of evaporator E-1 is neglected.

As 22,000 kg/h water evaporates from the jacket of evaporator/condenser E-1 and only A=20,000 kg/h condense in the tubes, a flow rate B=2,000 kg/h of condensate is still necessary to match the heat balance of the evaporator. So, in tower T-1, 2,000 kg/h vapour is condensed from 7,200 kg/h vapour contained in the gas-vapour mixture and developed from the condensate at the output of evaporator E-1.

As a consequence, the vapour content of the gas mixture not condensed in evaporator E-1 lowers from 70% by volume at the entrance of tower T-1 to 62% by volume at the output of the head of the tower itself.

Therefore, in round figures, a flow rate of condensate $P_T$ at 50° C. should be fed to the head of tower T-1:

$$P_T = \frac{2,000 * 540}{(110° - 50° C.)} \cong 18,000 \text{ kg/h}$$

which is the correct water amount necessary to the condensation of 2,000 kg/h vapour at a temperature of the liquid flowing back to separator V-1 equal to 110° C., still neglecting the sensible heat of the gas-vapour mixture leaving the tower at 107° C.

In conclusion, the recirculation flow rate P of pump P-1 will be the sum of condensate A in evaporator E-1 and B in tower T-1 as well as the water $P_T$ supplied to the tower, i.e.:

P=A+B+$P_T$=20,000+2,000+18,000=40,000 kg/h the portion to be evaporated PE being the total condensate PC equal to the sum of the two condensates in evaporator E-1 and tower T-1, i.e.:

PE=PC=A+B=20,000+2,000=22,000 kg/h

The heat load Q on the outside cooler E-2 caused by the cooling of the total recirculation flow rate P=40,000 kg/h from 110° C. to 50° C. is:

Q=40,000×(110° C.–50° C.)=2,400,000 kcal/h which is equal, as already shown, to the difference of the total enthalpies of the input gas He and output gas Hu of the system.

Surface S of thermal exchange of cooler E-2 is 120 m$^2$. The water consumption in cooler E-2 by an increase in temperature of 15° C. (from 30 to 45° C.) is equal to 2,400,000/15=160 m$^3$/h.

The total heat load of condenser/evaporator E-1 is about 14,000,000 kcal/h with a thermal exchange surface S=1800 m$^2$ (calculated on the base of the conditions specified above).

As far as filter F-1 is concerned, it should be appreciated that it has been selected according to a number of laboratory experiments carried out with a water solution of a coke sample provided by a manufacturer of ethylene. Experimental trials showed that a metal filter of the so-called "leaf" type proved to be particularly suitable as it allows advantageously the cake to be dried and the filter to be cleaned without opening the apparatus.

In particular, a filter of 80 $\mu$m seems to be sufficient to allow the specifications relative to the dust content in the effluent to be met.

It should be further appreciated that such a filter certainly has a greater mechanical strength and wear resistance with respect to a filter of 40 $\mu$m which, however, gives a limpid filtrate since the very beginning of operation.

The filtering surface of 100 m$^2$ according to the embodiment disclosed above should be dimensioned according to the minimum detectable water flow rate so that the adherence of the cake to the filter is guaranteed during all operation steps.

The volume of the cake of 1200 litres in the present example is calculated according to the number of decoking cycles between two cleaning operations of filter F-1, thereby conditioning the volume of the filter.

Advantageously, according to the invention, the cleaning of the filter, which is necessary when the cake reaches the volume according to the design, can be carried out automatically by a mechanical vibrator connected to the filtering cake. Such cleaning has to be carried out when the apparatus is non-operating, with the filter throttled on the water side, after having dried the cake in air.

It should be noted that, as the cake reaches the volume according to the design, the necessity of cleaning filter F-1 is shown by the increase in the load loss of the filter.

The dried coke dust is collected by the lower cone of the filter in a container for its removal and further treatment (e.g. sintering in little cylinder for the marketing) or a direct utilization under the form of dust in the heating plant of the production plant.

It should be appreciated that the removal of the coke dust is carried out by filtering only the liquid condensate and not gases and vapours in the decoking flue gases, thus allowing advantageously the overall dimensions and the volume of the filter means to be strongly reduced.

Similarly, the washing of the gases that cannot be condensed is carried out only for a limited volume of gases and vapours because the condensate is evaporated with thermal recovery only before it is vented to the atmosphere by said pipe 9.

An integral part of the present invention is a process comprising essentially the following steps:

condensing the portions of the flue gases from decoking step that can be condensed in a condenser/evaporator E-1;

collecting the liquid condensate containing coke in a gas-condensate separator V-1;

filtering the condensate containing coke by a filter F-1;

washing the gases and vapours that cannot be condensed in a suitable washing tower T-1;

venting washed gases and vapours as well as the filtered condensate to the atmosphere after its evaporation in condenser/evaporator E-1.

Said process is essentially autothermal as the vaporization of the filtered condensate from the coke is caused by the heat of the input effluents. A portion of the thermal content of the gases from the decoking step is transferred to a cooler (E-2) causing the heat to be disposed outside.

The process according to the invention allows a vapour-gas mixture to be vented to the atmosphere at a temperature equal to or greater than 180° C. with a solid content lower than 50 mg/Nm$^3$ dry gas.

Furthermore, it does not produce liquid effluents causing pollution because of their coke particle content to be treated successively. In fact, all of the vapours contained in the effluents is vented to the atmosphere together with the input gases.

The present invention has been described and illustrated according to a preferred embodiment of an installation, however, it is evident that anyone skilled in the art can make equivalent modifications and/or replacements without departing from the scope of the present industrial invention.

The following sheets show Tables 1 to 5 and T1, T2 which the description is referred to.

TABLE 1

COKE DUST REDUCTION IN THE DECOKING EFFLUENTS
Composition and flow rates of the gaseous effluents from a typical cracking oven
with nominal capacity of 25,000 t/y ethylene during the three decoking steps

| Step | Duration (hr) | Steam rate (kg/h) | $O_2$ (kg/h) | $N_2$ (kg/h) | $CO_2$ (kg/h) | CO (kg/h) | Temperature (° C.) |
|---|---|---|---|---|---|---|---|
| Stand-by | — | 10000 | — | — | — | — | 340 |
| 1 | 2 | 8600 | — | 693 | 284.6 | — | 340 |
| 2 | 2 | 7800 | 161 | 1078 | 199 | 28 | 340 |
| 3 | >>2 | 7400 | 690 | 2310 | — | — | 340 |

TABLE 2

Composition and flow rates of the gaseous effluents from a cracking oven
with nominal capacity of 25,000 t/y ethylene during the three decoking steps

| Step | Duration (hr) | Steam rate (kg/h) | $O_2$ (kg/h) | $N_2$ (kg/h) | $CO_2$ (kg/h) | CO (kg/h) | Temperature (° C.) |
|---|---|---|---|---|---|---|---|
| Stand-by | — | 20000 | — | — | — | — | 340 |
| 1 | 2 | 18600 | — | 693 | 284.6 | — | 340 |
| 2 | 2 | 17800 | 161 | 1078 | 199 | 28 | 340 |
| 3 | >>2 | 17400 | 690 | 2310 | — | — | 340 |

TABLE 3

COKE DUST REDUCTION IN THE DECOKING EFFLUENTS

Characteristics and Amount of Coke produced in the decoking operation

| | Oven of 25,000 t/y | Oven of 50,000 t/y |
|---|---|---|
| Total amount (kg)<sup>(\*)</sup>: | 200 | 400 |
| Peak (kg/h max.): | 100 | 100 |
| Apparent density (kg/m³): | 1500 | 1500 |

Granulometry

| Upper Limit (μm) | Lower Limit (μm) | Dimension (av.) (μm) | % weight | % cumulative weight |
|---|---|---|---|---|
| 5000 | 3000 | 4000 | 1.4 | 1.4 |
| 3000 | 2000 | 2500 | 4.2 | 5.6 |
| 2000 | 1600 | 1800 | 3.5 | 9.1 |
| 1600 | 1000 | 1300 | 8.7 | 17.8 |
| 1000 | 500 | 750 | 16.6 | 34.4 |
| 500 | 200 | 350 | 30.1 | 64.5 |
| 200 | 100 | 150 | 22.3 | 86.8 |
| 100 | 60 | 80 | 7.8 | 94.6 |
| 60 | 20 | 40 | 4.2 | 98.8 |
| 20 | 10 | 15 | 0.7 | 99.5 |
| 10 | 1 | 6 | 0.5 | 100 |

<sup>(\*)</sup>At the end of the operation an oven of 50,000 t/y with 8 coils requires as an average a longer time than the time required by an oven of 25,000 t/y with 4 coils, while the total coke is about double as high.

TABLE 4

COKE DUST REDUCTION IN THE DECOKING EFFLUENTS
(according to the regulations of some European countries)
Maximum content of coke admissible in the effluents from an oven of 25,000 t/y

| | | Step 1 | | Step 2 | | Step 3 | |
|---|---|---|---|---|---|---|---|
| Component | (MW) | Kg/h | Nm³/h | Kg/h | Nm³/h | Kg/h | Nm³/h |
| $H_2O$ | (18) | 8,600 | 10,708.9 | 7,800 | 9,712.7 | 7,400 | 9,214.6 |
| $O_2$ | (32) | — | — | 161 | 112.8 | 690 | 483.8 |
| $N_2$ | (28) | 693 | 554.7 | 1,078 | 862.9 | 2,310 | 1,849.1 |
| $CO_2$ | (44) | 284.6 | 145.0 | 199 | 101.4 | — | — |
| CO | (28) | — | — | 28 | 22.4 | — | — |
| Total Nm³/h | | | 11,376.8 | Total Nm³/h | 10,811.2 | Total Nm³/h | 11,547.5 |
| Dry Volume Nm³/h | | | 667.9 | Dry Volume | 1,099.0 | Dry Volume | 2,332.9 |
| Max. Coke, (g/h) | | | 33.4 | Max. Coke | 54.9 | Max. Coke | 116.6 |
| Max. conc. (dry), mg/Nm³ | | | 50 | Max. conc. (dry) | 50 | Max. conc. (dry) | 50 |
| Max. conc., mg/Nm³(\*) over the total flow rate | | | 2.9 | Max. conc. over the total flow rate | 5.1 | Max. conc. over total flow rate | 10.1 |

(\*)During step 1, the concentration of coke over the total flow rate (= vapour + gas) should be not greater than 2.9 mg/Nm³

TABLE 5

COKE DUST REDUCTION IN THE DECOKING EFFLUENTS
(according to the regulations of some European countries)
Maximum content of coke admissible in the effluents from an oven of 50,000 t/y

| Component (MW) | | Step 1 kg/h | Step 1 Nm³/h | Step 2 kg/h | Step 2 Nm³/h | Step 3 kg/h | Step 3 Nm³/h |
|---|---|---|---|---|---|---|---|
| $H_2O$ | (18) | 18,600 | 23,161.3 | 17,800 | 22,165.0 | 17,400 | 21,663.0 |
| $O_2$ | (32) | — | — | 161 | 112.8 | 690 | 483.2 |
| $N_2$ | (28) | 693 | 554.7 | 1,078 | 1,342.3 | 2,310 | 1,848.8 |
| $CO_2$ | (44) | 284.6 | 145.0 | 199 | 145.1 | — | — |
| $CO$ | (28) | — | — | 28 | 22.4 | — | — |

| | | |
|---|---|---|
| Total Nm³/h | 23,861.0 | Total Nm³/h 23,787.5 Total Nm³/h 23,995 |
| Dry Volume Nm³/h | 669.7 | Dry Volume 1,622.60 Dry Volume 2,332 |
| Max. Coke, (g/h) | 35.0 | Max. Coke 81.1 Max. Coke 116.6 |
| Max. conc. (dry) mg/Nm | 50 | Max. conc. (dry) 50 Max. conc. (dry) 50 |
| Max. conc. mg/Nm³(*) over the total flow rate | 1.47 | Max. conc. over the total flow rate 3.41 Max. conc. over the total flow rate 5.38 |

(*)During Step 1, the coke concentration over the total flow rate (= vapour + gas) should be not greater than 1.47 mg/Nm³

TABLE T1

OF THE COMPARED TECHNOLOGIES

| | Technology | Design or licence |
|---|---|---|
| 1 | Conventional cyclone | A: other |
| | | B: other |
| 2 | Innovatory cyclone | other |
| 3 | Sintered metal filters | other |
| 4 | Fiberglas filters | other |
| 5 | Eletrofilters | other |
| 6 | Fluid-bed burners | A: other |
| | | B: other |
| 7 | autothermal separator | Technip Italy |
| 8 | Water reduction tower | Technip Italy |
| 9 | Water condensation | Technip Italy |
| 10 | Counter-current water jet scrubber | other/ Technip Italy |

What is claimed is:

1. An apparatus for reducing the coke dust in the decoking effluents of the hydrocarbon cracking ovens, comprising means for the condensation of the effluent, means for collecting a liquid condensate, means for filtering said liquid condensate, and means for washing the residual vapours and gases that cannot be condensed by using the same condensate suitably filtered from coke, the filtered condensate being evaporated for the following discharge to the atmosphere by using the thermal content of the input decoking gases.

2. The apparatus for reducing the coke dust according to claim 1, wherein it includes in combination:
   a horizontal tank acting as separator (V-1) of gases and condensates for collecting the condensate containing coke;
   a vertical tube nest exchanger having the function of condenser/evaporator (E-1) and overlaying one end of gas-condensate separator (V-1) so that the falling condensate is collected in said separator;

TABLE T2 OF TOTAL VALUATION

| | Technology | | Performance (0 ÷ 15) | Reliability (0 ÷ 15) | Impact[1] (0 ÷ 15) | Operation (0 ÷ 15) | Maintenance[2] (0 ÷ 15) | Investment | Total valuation (0 ÷ 90) |
|---|---|---|---|---|---|---|---|---|---|
| 1 | conventional | A | (2) | 15 | 15 | 15 | 10 | 15 | (2) |
| | cyclones | B | (2) | 15 | 15 | 15 | 10 | 10 | (2) |
| 2 | Innovatory cyclone | | 15[4] | 5 | 15 | 10 | 10 | 15 | 70[4] |
| 3 | Sintered metal filters | | 15 | 5 | 10 | 5 | 5 | 5 | 45 |
| 4 | Fiberglas filters | | 15 | 5 | 5 | 5 | 5 | 5 | 40 |
| 5 | Electrofilters | | | | NOT CLASSIFIED | | | | N.C. |
| 6 | Fluid-bed | A | | | NOT CLASSIFIED | | | | N.C. |
| | burners | B | | | | | | | |
| 7 | autothermal separator | | 15 | 15 | 15 | 15 | 15 | 10 | 85 |
| 8 | Water reduction tower | | 10 | 15 | 5 | 15 | 15 | 10 | 70 |
| 9 | Water condensation | | 15 | 15 | 5 | 15 | 15 | 5 | 70 |
| 10 | Counter-current water jet scrubber | | 15 | 10 | 5 | 15 | 10 | 5 | 60 |

[1]Other values of performance referred to the gaseous effluent, such as: volume of liquid, visibility of vapours, removal of solid, complexity of layout, utility consumption, etc.
[2]Only material
[3]Not guaranteed performance
[4]Performance to be checked
[5]Investment estimated by Technip Italy.

a filter (F-1) for the separation of the coke dust from the liquid condensate;

a circulation pump (P-1) of the liquid condensate;

a cooler (E-2) of the liquid condensate and filtrate;

a vertical washing tower (T-1) located at the other end of separator (V-1) and overlaying the same, which is crossed by the gases than cannot be condensed and the vapours that have been separated from the condensate to be washed in counter-current along with a portion of the same condensate which is filtered in separator (F-1) and cooled in cooler (E-2) and fed to the tower;

said condenser/evaporator (E-1) causes the input decoking gases to be condensed and the filtered, cooled liquid to evaporate by means of the heat from the condensation itself and to be vented to the atmosphere along with washed gases and vapours that cannot be condensed.

3. The apparatus of claim 1, wherein the gases that cannot be condensed and the vapours that are separated from the condensate inside the tank/separator (V-1) flow to washing tower (T-1) where they are washed in counter-current along with a portion of the condensate that is filtered, cooled, and fed under flow rate control by a control valve (v-4) to the tower (T-1) again where the washing of the gas and a further condensation of the vapour take place, the total condensate of the system being equal to the condensate that is produced in condenser/evaporator (E-1) plus the condensate formed in the tower, while the not condensed gases flow back to the jacket of evaporator (E-1) through a vent valve (v-1) where they are overheated by the hot flue gases before being vented to the atmosphere.

4. The apparatus of claim 1, comprising a pressure controller (PC) in washing tower (T-1) that operates a control valve (v-2) which throttles the overflow weir of a pipe (5) between evaporator (E-1) and separator (V-1) and opens a head vent valve (v-1) of tower (T-1) that vents an amount of gas-vapour mixture equal to the amount of gas-vapour entering the apparatus to the atmosphere through the jacket of evaporator (E-1) and a pipe (9).

5. The apparatus of claim 1, wherein only the condensate exceeding a predetermined level in tank (V-1) is fed to the jacket of evaporator (E-1) by control valve (v-3) after cooling in cooler (E-2) so that it can be disposed by evaporation in order to keep the initial water content essentially stationary, said control valve (v-3) being placed in pipe (4) in which the liquid condensate flows back from cooler (E-2) and condenser/evaporator (E-1) and being operated by a level controller (LC) of tank (V-1).

6. The apparatus of claim 1, comprising a temperature controller (TC) in the vent pipe of line (9) which adjusts the discharge temperature to the desired value by operating a control valve (v-5) placed in a line (8) by-passing cooler (E-2).

7. The apparatus of claim 1, wherein as soon the entering gas is reduced in volume so that the decoking operation is about to end, the head vent valve (v-1) of washing tower (T-1) reduces its leaking and closes gradually, while valve (v-2) in pipe (5) between condenser and tank opens and establishes the initial water circulation again, thus providing a self-regulation of the apparatus to the rest condition, at the end of the decoking, without any operator.

8. The apparatus of claim 1, wherein the cleaning of filter (F-1) which is necessary when the cake reaches the volume according to the design, can be carried out automatically by a mechanical vibrator connected to the filtering cake, such cleaning being carried out when the apparatus is non-operating, with the filter throttled on the water side, after having dried the cake in air.

9. The apparatus of the claim 8, wherein as the cake reaches the volume according to the design, the necessity of cleaning filter F-1 is shown by an increase in the load loss of the filter.

10. The apparatus of claim 1, wherein the coke filter (F-1) is of the metal leaf type.

11. The apparatus of claim 1, wherein the dimensions of the screen of filter (F-1) are in the range between 40 and 80 $\mu$m.

12. A process for reducing the coke dust in the decoking effluents of the hydrocarbon cracking ovens, comprising receiving the solid content in the gaseous effluent from the decoking by filtration of the condensate from said gaseous effluent and washing of gases and vapours contained therein that cannot be condensed.

13. The process of claim 12, wherein the following steps:

condensing the portions of the flue gases from the decoking step that can be condensed in a condenser/evaporator (E-1);

collecting the liquid condensate containing coke in a gas-condensate separator (V-1);

filtering the condensate containing coke by a filter (F-1);

washing the gases and vapours that cannot be condensed in a suitable washing tower (T-1);

venting washed gases and vapours as well as the filtered condensate to the atmosphere after its evaporation in condenser/evaporator (E-1).

14. The process of claim 13, wherein the process is essentially autothermal as the vaporization of the filtered condensate from the coke is caused by the heat of the input effluents, a portion of the thermal content of the gases from the decoking step being transferred to a cooler (E-2) causing the heat to be disposed outside.

15. The process of claim 14, wherein the washing of gases and vapours that cannot to be condensed in tower (T-1) takes place by using the liquid condensate which has been filtered in filter (F-1) and cooled in cooler (E-2).

\* \* \* \* \*